(12) United States Patent
Gwozdz et al.

(10) Patent No.: US 7,419,527 B2
(45) Date of Patent: Sep. 2, 2008

(54) INCREASED DENSITY PARTICLE MOLDING

(75) Inventors: Garry Gwozdz, Nazareth, PA (US); Mark Mitchnick, East Hampton, NY (US); David Fairhurst, Congers, NY (US)

(73) Assignee: Particle Sciences, Inc., Bethlehem, PA (US)

( * ) Notice: Subject to any disclaimer, the term of this patent is extended or adjusted under 35 U.S.C. 154(b) by 371 days.

(21) Appl. No.: 10/434,397

(22) Filed: May 8, 2003

(65) Prior Publication Data

US 2004/0221682 A1 Nov. 11, 2004

(51) Int. Cl.
*B22F 1/02* (2006.01)
*B22F 3/00* (2006.01)

(52) U.S. Cl. .............................. 75/252; 419/35; 419/36; 419/38

(58) Field of Classification Search .................. 75/252; 419/35, 36, 38; 428/405, 407
See application file for complete search history.

(56) References Cited

U.S. PATENT DOCUMENTS

| 5,028,347 | A | * | 7/1991 | An et al. .................. 252/62.54 |
| 5,256,185 | A | | 10/1993 | Semel et al. .................. 75/255 |
| 5,368,630 | A | | 11/1994 | Luk ............................ 75/252 |
| 5,385,973 | A | * | 1/1995 | Marciandi et al. ............ 524/730 |
| 5,756,788 | A | | 5/1998 | Mitchnick et al. .............. 556/10 |
| 5,798,439 | A | * | 8/1998 | Lefebvre et al. ............. 528/489 |
| 5,800,636 | A | * | 9/1998 | Tsukada et al. .............. 148/306 |
| 5,900,636 | A | * | 5/1999 | Nellemann et al. ...... 250/363.04 |
| 5,989,304 | A | | 11/1999 | Ozaki et al. .................... 75/252 |
| 6,045,650 | A | | 4/2000 | Mitchnick et al. ........... 156/279 |
| 6,139,600 | A | | 10/2000 | Ozaki et al. .................... 75/255 |
| 6,194,069 | B1 | * | 2/2001 | Adachi et al. ............... 428/403 |
| 6,235,076 | B1 | | 5/2001 | Ozaki et al. .................... 75/252 |
| 6,395,687 | B1 | * | 5/2002 | Hanejko ..................... 508/243 |
| 6,413,638 | B1 | * | 7/2002 | Mager et al. ................. 428/403 |

FOREIGN PATENT DOCUMENTS

JP 1165701 6/1989

* cited by examiner

*Primary Examiner*—Roy King
*Assistant Examiner*—Ngoclan T Mai
(74) *Attorney, Agent, or Firm*—Mark A. Litman & Associates, P.A.

(57) ABSTRACT

Novel powders or particles are formed by associating them with relatively small proportions of hydrolysable liquid material. The resulting particle/liquid mass is placed in a mold and sintered under conditions of heat and pressure that enables at least some of the hydrolysable liquid to react within the sintered mass. The sintered mass displays a controllable range of properties such as increased density, increased tensile strength, and improved natural polish finish. The hydrolysable liquid may partially hydrolyze and/or react with the powders and particles, but the liquid is not completely (not 100%) reduced to an inorganic oxide prior to introduction to the mold and performance of the sintering process.

20 Claims, No Drawings

INCREASED DENSITY PARTICLE MOLDING

FIELD OF THE INVENTION

The present invention relates to particle-based molding compositions, powder-based molding processes, and particularly metal-based or inorganic oxide-based powder compositions for powder metallurgy in which treated powders are used in the process. The treated particles provide molded, sintered, or compressed products that may display increased density, reduced brittleness and increased strength. The powders are coated with hydrolysable compositions and then molded with reduced levels of adjuvants or in the absence of significant levels of adjuvants such as binders, fillers and lubricants.

BACKGROUND OF THE ART

Hitherto, iron-based powder compositions for powder metallurgy have been produced by a mixing method in which alloying powders such as core materials such copper, graphite, and iron phosphide powders, are mixed with an iron powder, and according to the necessity, in addition to the powders for improving the machinability, a lubricant such as zinc stearate, aluminium stearate, and lead stearate is mixed into the composition. Such a lubricant has been adopted in view of a desire for homogeneous mixing with a metal powder, easy decomposition and removability of materials other then the core materials at the time of sintering.

Recently, as the requirement of higher strength for sintering manufactures is increased, as disclosed in U.S. Pat. No. 5,256,185 and U.S. Pat. No. 5,368,630, it has been proposed in the industry to use a warm compaction technology which permits higher density and higher strength of compacts by means of performing a compaction while metal powders are heated. It is considered for the lubricant used in such a compaction procedure that a lubricity at the time of heating is important as well as the homogeneous mixing with a metal powder, the ease of decomposition and the removability of the lubricant at the time of sintering. Specifically, a mixing of mixtures of a plurality of lubricants having mutually different melting points with metal powders serves, at the time of a warm compaction, to melt part of the lubricants, to uniformly spread the lubricants between iron and/or alloying metal particles, and to decrease frictional resistances among the particles and between a compacted form and dies, so that compactibility of the material and accuracy of the formed rendition is improved.

However, such a metal powder composition involves the following drawbacks. First, a raw material mixture undergoes segregation. Regarding the segregation, since the metal powder composition contains powders having different sizes, shapes and densities, segregation occurs readily during transport after mixing and upon charging the powder composition into hoppers, or upon discharging the powder composition from the hoppers or during molding treatments. For example, it is well known that segregation of a mixture of iron-based powder and graphite powder occurs within a transport vehicle owing to vibrations during trucking, so that the graphite powder rises to the top. It is also known with respect to graphite charged into a hopper that the concentration of graphite powder differs at the beginning, middle, and end of the discharging operation from the hopper owing to segregation within the hopper. These segregations cause fluctuations in the composition of products of the powder metallurgy; fluctuations in dimensional changes and strength become large, and this causes the production of inferior products.

The flow rate of the powder composition increases as a result of the increased specific surface area of the mixture, since graphite and other powders are fine powders. Such increases in flow rate are disadvantageous because it decreases the production speed of green compacts by decreasing charging speed of the powder composition into die cavities for compaction.

As for technologies for preventing segregation of such a powder composition, there are known methods based on selection of an appropriate binder as disclosed in Japanese Patent Application Laid Open Gazette (Kokai) Sho.56-136901 and Japanese Patent Application Laid Open Gazette (Kokai) Sho.58-28321. However, these methods involve such a drawback that if the quantity of binder added is increased so that segregation of the powder composition is sufficiently improved, the flow rate of the powder composition is increased.

Japanese Patent Application Laid Open Gazette (Kokai) Hei.1-165701 and Japanese Patent Application Laid Open Gazette (Kokai) Hei.2-47201 proposed methods in which a melt composed of the combination of an oil and a metal soap or wax, melted together is selected as a binder. These methods make it possible to sufficiently reduce segregation of a powder composition and dust generation, and also to improve the flowability. However, these methods involve such a problem that the flowability of the powder composition varies with the passage of time owing to means for preventing the segregation mentioned above. Previous technologists developed a method in which a melt composed of the combination of a high-melting point of oil and a metal soap, melted together is selected as a binder, as proposed in Japanese Patent Application Laid Open Gazette (Kokai) Hei.2-57602. According to this method, the melt has a small change of elapse, and a change of elapse of flow rate of the powder composition is reduced. However, this method involves another drawback such that apparent density of the powder composition varies, since a high-melting point of saturated fatty acid of solid state and a metal soap are mixed with iron-based powders at the room temperature.

U.S. Pat. No. 5,989,304 describes an iron-based powder composition for powder metallurgy excellent in flowability and compactibility is produced in accordance with a method comprising the steps of: adding to iron-based and alloying powders, for a primary mixing, a surface treatment agent, and in addition, for a secondary mixing, a fatty acid amide and at least one lubricant, wherein the lubricant has a melting point higher than that of the fatty acid amide and can be a thermoplastic resin, a thermoplastic elastomer, and inorganic or organic compounds having a layered crystal structure; heating and stirring up a mixture after the secondary mixing at a temperature above a melting point of the fatty acid amide to melt the fatty acid amide; cooling, while mixing, the mixture subjected to the heating and stirring process so that the alloying powder and a lubricant having a melting point higher than the fatty acid amide adhere to a surface of the iron base powder subjected to the surface treatment by an adhesive force of the melt; and adding at the time of the cooling, for a tertiary mixing, a metallic soap and at least one thermoplastic resin or thermoplastic elastomer powders and inorganic or organic compounds having layered crystal structure. The mixture is heated to about 423K and loaded into a die for compaction.

U.S. Pat. No. 6,139,600 describes an iron-based powder composition made by a process comprising the steps of: adding to iron-based and alloying powders, for a primary mixing, a surface treatment agent, and in addition, for a secondary mixing, a fatty acid amide and at least one lubricant, wherein the lubricant has a melting point higher than that of the fatty acid amide and can be, a thermoplastic resin, a thermoplastic elastomer, and inorganic or organic compounds having a layered crystal structure; heating and stirring up a mixture after the secondary mixing at a temperature above a melting point of the fatty acid amide to melt the fatty acid amide; cooling, while mixing, the mixture subjected to the heating and stirring process so that the alloying powder and a lubricant having a melting point higher than the fatty acid amide adhere to a surface of the iron base powder subjected to the surface treatment by an adhesive force of the melt; and adding at the time of the cooling, for a tertiary mixing, a metallic soap and at least one a thermoplastic resin or thermoplastic elastomer powders and inorganic or organic compounds having layered crystal structure. The mixture is heated to about 423K and loaded into a die for compaction.

U.S. Pat. No. 6,235,076 describes an iron-based powder composition for powder metallurgy having excellent flowability at room temperature and a warm compaction temperature, having improved compactibility enabling lowering ejection force in compaction, to provide a process for producing the iron-based powder composition, and to provide a process for producing a compact of a high density from the iron-based powder composition. The iron-based powder composition comprises an iron-based powder, a lubricant, and an alloying powder, and at least one of the iron-based powder, the lubricant, and the alloying powder is coated with at least one surface treatment agent selected from the group of surface treatment agents of organoalkoxysilanes, organosilazanes, titanate coupling agents, fluorine-containing silicon silane coupling agents. The iron-based powder composition is compacted at a temperature not lower than the lowest melting point of the employed lubricants, but not higher than the highest melting point of the employed lubricants.

U.S. Pat. No. 5,756,788 discloses a process for making metal oxide hydrophobic by coating the metal oxide with a silicone polymer is disclosed. The hydrophobic metal oxide is prepared by contacting the metal oxide with a reactive silicone compound and then in a subsequent step the coated metal oxide is heated to 40° to 100° C. for between 1 and 10 hours. The resulting metal oxide is hydrophobic, non-reactive, not affected by water and can be applied to the skin for protection from ultraviolet light of the sun. U.S. Pat. No. 6,045,650 discloses a method for adjusting the surface properties of materials by the application and reaction of liquid compositions. The process applies a solid coating onto a surface of an article. The surface of an article has a first physical property measurable as a degree of hydrophobicity and/or hydrophilicity. A liquid coating of an oxidizable material containing at least one element other than carbon, hydrogen, oxygen and nitrogen is applied onto the surface of the article. The oxidizable material is oxidized on the surface to attach an oxidized material having said at least one element other than carbon, oxygen, nitrogen and hydrogen onto said surface. This process thereby changes the first physical property with respect to its hydrophobicity and/or hydrophilicity. The process is relatively gentle to the underlying surface, at least in part because of the moderate temperatures which may be used for oxidation, and a wide range of properties may be provided onto the surface by appropriate selection and/or mixing of the liquid material and selection of the surface. The process is particularly useful with particulate materials.

SUMMARY OF THE INVENTION

Powders or particles are associated with relatively small proportions of hydrolysable liquid material and the particle/liquid mass is placed in a mold and sintered under conditions of heat and pressure that enables at least some of the hydrolysable liquid to react within the sintered mass. The sintered mass displays a controllable range of properties such as increased density (as compared to compositions formed with other additives or adjuvants), increased tensile strength (as compared to compositions formed with other additives or adjuvants), and improved natural polish finish (as compared to compositions formed with other additives or adjuvants). The hydrolysable liquid may partially hydrolyze and/or react with the powders and particles, but the liquid is not completely reduced to an inorganic oxide prior to introduction into the mold and before initiation of performance of the sintering process. Preferably hydrolysis is more than 1% but less than 90% and hydrolysis in the range of 2-85%, and 10-50% is particularly useful.

DETAILED DESCRIPTION OF THE INVENTION

The basic process of the present invention comprises applying a liquid coating of a hydrolysable liquid onto a particle surface or powder surface (hereinafter generally referred to as the particle surface, e.g., a spherical, flat, shaped, regular, irregular or particulate surface), the hydrolysable liquid coating comprising, consisting essentially of, or consisting of a first compound having an inorganic hydrolysable group or moiety, and then reacting the first compound to form a stable coating compound which is bound to said surface. A mass of the coated particles is then positioned in the mold and a standard molding/sintering process is performed. The hydrolysable compound(s) of the hydrolysable liquid preferably comprises at least 90% by weight or volume, at least 95% by weight or volume, at least 96% by weight or volume, at least 97% by weight or volume, at least 99% by weight or volume, at least 98.5% by weight or volume, at least 99% by weight or volume and even 100% by weight or volume of the hydrolysable liquid.

A sintering process generally encompasses the placing of a powder or particles into a compression mold. Sufficient heat and pressure (dependent upon the nature of the materials in the particles) is applied to cause the particles to fuse to each other. Sintering may involve a degree of fusion from slightly greater than the minimum surface-to-surface contact formed by spheres or particles, to such surface-to-surface contact plus some minimal flow of softened or melted particle material to expand the surface area of the fusion, and such surface-to-surface contact plus significant flow of softened or melted particle material. Additional material may be present in the particle composition in prior art sintering processes, as noted by the references described above. In the practice of the present invention, it is desirable to minimize additives and to attempt to exclude most additives except for the hydrolysable compound(s). These hydrolysable compounds should be present as from about 0.005% by weight to 10% by weight of the particles. Other additives that are normally present in sintering compositions (such as polymeric binders, lubricants, plasticizers, surfactants, elasticizing agents, antioxidants, dispersants and the like) should be present in total amounts of less than 2%, less than 1.5%, less than 1.0%, less than 0.5% or preferably to less than 0.2% by weight, as in a range of 0.0 or 0.001 to 0.2%, or 0.0 or 0.001 to 0.05% by weight of particles. It is important to note some significant differences between the practice of this invention and particular teachings in the prior art. For example, U.S. Pat. No. 6,045,650 (Mitchnick et al.) discloses a method for applying many of the same hydrolysable liquid compounds to particles, but both the initial reaction, the objectives and the process differs substantively. In Mitchnick et al., the liquid is applied to surfaces, such as the surfaces of particles (including metals and metal oxides), then heated to form inorganic metal/semimetal oxides on the surfaces. This formed oxide changes the surface characteristics of the surfaces. The particles remain as particles and are then generally added as pigments or fillers in compositions. This is quite distinct from the practice of the present invention. Preferably hydrolysis is more than 1% but less than 90% in the present invention and hydrolysis in the range of 2-85%, and 10-50% is particularly useful, and the particles in the present invention are sintered while the particles in the Mitchnick et al. patent are maintained as individual particles and free-flowing particles.

In the present invention, the liquid hydrolysable material again coats particles (in this case the sinterable particles, preferably metal, semimetal, metal oxide or semimetal oxide particles), but then the heating step in the preparation of sinterable particles, which occurs at a temperature below that required to completely oxidize the coating of hydrolysable liquid associated with the coating does not react the coating material to an oxide coating. The heating step stabilizes the coating by a partial hydrolysis of the coating liquid. If complete oxidation were effected, then the particle would merely give the surface appearance of an oxide in the sintering process. Rather, in the present invention the reactive material is preserved in at least the form of a partially unreacted liquid or partially hydrolyzed (e.g., up to about 90% hydrolysis) liquid/solid, or fully hydrolyzed liquid/solid, and mixtures of the different materials. There may well be some chance oxide formed, but with a coating formed of at least less than 75% oxide (by weight), less than 50% oxide, less than 30% oxide, less than 20% oxide, less than 10% or 5% oxide or even 0% oxide, with ranges of 0-75%, 1-75%, 2-75%, 5-60%, and 10-50% being particularly desirable.

The process may be generally described as a sintering process comprising providing the free-flowing powder composition according to the invention into a mold. It is preferred that materials other than the particles and the coating be minimized. It would thus be preferred that at least 99% by weight of the composition consists of particles of metal and/or metal oxide having unagglomerated number average particle diameters of between 0.01 μm and 5 mm (preferably between 0.05 μm and 1 mm, between 0.05 μm and 0.5 mm, and between 0.10 μm and 1 mm, with other preferred ranges being between 0.1 mm and 5 mm average diameter between 0.5 μm and 100 μm and 0.5 μm and 500 μm) and a coating on the particles of an at least partially hydrolysed hydrolysable compound, the coating comprising from 0.005% to 10% by weight of the particles, and then heating and pressing the composition to sinter the powder.

Preferred liquid hydrolysable compounds comprise inorganic or more preferably metallic, metalloid or semimetallic ester containing compounds such as silicon or titanium compounds such as silanes or titanate (e.g., $R_m Si[OR^1]_n$) or $R_m Ti[OR^1]_n$), that is compounds wherein R is an organic group (preferably bonded to the Si or Ti atom through a carbon atom), halogen or hydrogen, $R^1$ is H, or an organic group, such as alkyl, aryl or heterocycle, preferably alkyl of 1 to 4 carbon atoms, wherein R is 0, 1, 2 or 3 and n is 1, 2, 3 or 4; titanate counterparts of the silanes, such as $R_m Ti[OR^1]_n$ in which R, $R^1$, m and n are as defined above; and any other oxidizable metallo or semimetallo compounds of the general formula $R_m M[R^1]_n$ wherein M is a metal or semimetal such as those selected from the group consisting of Si, Ti, Zn, Al, Sn, Fe, Cu, Zr, B, Mg, Mn, W, Sb, Au, Ag, Cr, and the like, R and $R^1$ are as defined above, m plus n equals the valence state of M, and n must be at least 1. In addition to the preferred silanes, mainly preferred because of their ease of use and ready commercial availability, silicon compounds such as silazanes, siloxane cyclics, siloxane dimers, siloxane trimers, silane fluids, and tris-)alkoxysiloxy)-3-metacryloxyalkylsilanes (less preferred) may be used in the practice of the present invention. The liquid hydrolysable compounds may also be fluorinated by having fluorinated alkyl groups present on the molecule, pereferably perfluorinated alkyl groups present on alkyl groups attached to the molecule.

In addition to these specific classes of compounds and metals/metalloids, and in addition to monometallic, monometalloid compounds as the starting materials, dimetallic (having two different metal/metalloid atoms, bimetallic (having two of the, same metal/metalloid atoms in the compound), heterometallic (having one metal and one metalloid atom in the same compound), dimetalloid and bi-metalloid compounds, and mixtures of any of these groups of compounds are useful in the practice of the present invention. Mixtures and blends of the compounds provide unique capabilities for uniformly distributing different properties over a surface, or balancing (averaging) properties over the surface. An extremely wide range of these classes of oxidizable metal or metalloid compounds are commercially available, as exemplified by the lists of compounds in the 1996 Gelest, Inc. chemical catalog (e.g., pages 287 for a generic description of heterometallic and heterometalloid alkoxides, including alkali metal combinations; and especially pages 21-217; 220-221; 231-233; and 258-265) and the 1994 PCR, Incorporated General Catalog of "Chemicals for Research Scientists, especially pages 192-193 and 198-199). Germanium compounds have a functional similarity to silicon compounds in the practice of the present invention. A wide range of these compounds, as shown in the 1996 Gelest, Inc. catalog identified above, as shown particularly on pages 216-217.

Similarly, as indicated above, oxidizable tin compounds are another class of compounds useful equivalently to the silicon compounds preferred in the practice of the present invention. There are many commercially available alternatives within this class, as shown for example on pages 258-264 of the 1996 Gelest, Inc. chemical catalog. Examples of R (as shown in the silicon compound formula above, and equally applicable in corresponding groups attached to other metal or metalloid atoms in the oxidizable compounds of the present invention) are apparent to those of ordinary skill in the art and they may be functional (e.g., specifically reactive) groups or relatively non-reactive groups which may provide useful physical properties when the material is deposited on the surface prior to oxidation, or less likely, leave a residue which is advantageous after oxidation. Such R groups would include aliphatic and aromatic groups such as alkyl groups, alkyl ester groups, poly(oxyalkylene) groups, phenyl groups, naphthyl groups, H, hetero groups (e.g., thioethers), functionally terminated groups such as amino-alkyl, epoxy-alkyl, carboxyalkyl, even possibly halogen atoms such as I, Br, Cl and F (but these are much less preferred because of the halogen products, including halogenic acids) and the like. $R^1$ may be any oxidizable group such as an ester group, including those with their own functionality on the distal (from the position of attachment) end of the group. Such groups R.sup.1 after attachment form ester or ester type groups so that R.sup.1 is actually an aliphatic or aromatic group such as R, but is preferably limited to aliphatic groups of 1 to 20 carbon atoms, more preferably 1 to 10 carbon atoms, and most preferably 1 to 4 carbon atoms for aliphatic groups and 1 to 10 carbon atoms for aromatic groups. For silicon based compounds, representative examples are the silicone compounds described in U.S. Pat. No. 5,486,631, the reactive silanes of U.S. Pat. No. 4,084,021 and many other commercially available silicon compounds which may be oxidized, particularly at temperatures between 250 to 600° C., and more particularly at temperatures between 350 and 500° C. It is also possible to use low temperature oxidizing environments, such as with oxidizing additives present or oxidizing vapor conditions, or with aerobically carried catalysts or accelerants to enable lower temperature oxidation onto surfaces which ordinarily could not withstand the temperatures used to oxidize the silicon containing materials (or other classes of materials). The oxidation product of this reaction may actually create a direct chemical bond to the composition of the substrate, or may merely create strong physical attachments, but the former appears to be the more likely result based on washing of the surfaces after the oxidation process.

The other classes of compounds include the counterparts of these compounds (i.e., with the silicon replaced by the other elements) such as titanate esters, zirconium esters, and other metal or non-metal esters. Mixtures of the various oxidizable compounds may be used, as suggested above, with particularly beneficial results, providing variations or mixtures of properties on surfaces, discontinuous areas of specific properties, blends (averages of properties), and the like.

A non-exhaustive list of compounds useful within the practice of the present invention includes such materials as: Isobutyltrimethyoxysilane, Aminopropyltriethoxysilane, Aminopropyltriethoxysilane, 3-Methacryloxypropyltrimethoxysilane, n-(2-Aminoethyl)-3-aminopropyltrimethoxysilane, 3-Glycidoxypropyltrimethoxysilance, n-Octyltriethoxysilane, Hexamethyldisilazane, Diethylsilane, Vinyldimethylchlorosilane, Vinylmethyldichlorosilane, Vinylmethyldimethoxysilane, Tetrakis[1-methoxy-2-propoxy]silane, Triethylchlorosilane, Vinylmethyldiethoxysilane, Vinyltrichlorosilane, Vinyltrimethoxysilane, Vinyltriethoxysilane, Dimethyldiethoxysilane, Hexamethyldisilazane, Divinyltetramethyldisilazane, Tetramethyldisilazane, Heptamethyldisilazane, Tris[(trifluoropropyl)methyl]cyclotrisiloxane, Methylvinylcyclotetrasiloxane, 1,3,5,7-Tetramethylcyclotetrasiloxane, 1,3,5,7,9-Pentamethylcyclopentasiloxane, Hexamethyldisiloxane, Divinyltetramethyldisiloxane, Divinyltetramethyldisiloxane (high Purity), Tetramethyldisiloxane, 1,3-Bis(3-aminopropyl)polydimethylsiloxane, Heptamethyltrisiloxane, Chlorinated phenyl methyl polysiloxane, 1,3Bis(aminopropyl)tetramethyldisiloxane, Bis(3-aminopropyl)polydimethylsiloxane, Bis(3-aminopropyl)polydimethylsiloxane, Diethoxy polydimethylsiloxane, Tris(trimethylsiloxy)3-mehtacryloxypropylsilane, Tetraisopropoxygermane, Tetrakis(Trimethylsiloxy-Germane, Tetramethoxygermane, Tetramethylgermane, Tetrapentylgermane, Tetraphenylgermane, Tetra-n-Propylgermane, Tetra-p-Tolylgermane, Triallylfluorogermane, Tri-n-Butylacetoxygermane, Tetraphenyltin, Tetravinyltin, Tetraphenltin Tetravinyltin, Tin II Acetate, Tin IV Acetate, Tin Acetylacetonate, Tin t-Butoxide, Tin II Chloride, anhydrous Tin II Chloride, Dihydrate Tin IV Chloride, anhydrous Tin II Ethoxide, Tin II Flouride, Tetramethyltin, Tetra-n-Octyltin, Tetra-n-Pentyltin, Tetraethyltin, Tetraisopropoxytin-Isopropanol Adduct, Tetraisopropyltin, Tetrakis(Diethylamino)Tin, Tetrakis(Dimethylamino)Tin, Potasium Stannate trihydrate, Sodium Stannate trihydrate, Sodium Tin Ethoxide, Stannic Chloride, Tetraacetoxytin, Tetraallyltin, Tetra-t-Butoxytin, Tetra-n-Butyltin, Methacryloxytri-n-Butyltin, Methyltrichilorotin, Phenylethynyltri-n-Butyltin, Phenyltri-n-Butyltin, Phenyltrichlorotin, Divinyldi-n-Butyltin, 1-Ethoxyvinyltri-n-Butyltin, Ethynyltri-n-Butyltin, Hexabutyldistannoxane, Hex-n-Butylditin, Hexamethylditin, Dimethylhydroxy(Oleate)Tin, Dimethyltin Oxide, Dioctyldichlorotin, Dioctyldilauryltin, Dioctyldineodecanoatetin, Dioctyl(Maleate)Tin, Dioctyltin Oxide, Diphenyldichlorotin, Allytrichlorogermane, Allyltriethylgermane, Allytrimethylgermane, 3-Aminopropyltributylgermane, Ammonium Hexafluorogermanate, Ammonium Tris(Oxalato)Germanate, Benzyltricholorogermane, Bis[Bis(Trimethylsilyl)Amino]-Germanium II, Bis(Chloromethyl)Dimethylgermane, Bismuth Germanate, Bromomethyltribormogermane, Bromotrimethylgermane, Tetra-n-Butylgermane, Tetraethoxygermane, and Tetraethylgermane.

Preferred silicon compounds of the present invention may be represented by the formula:

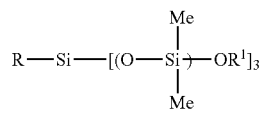

wherein Me is a methyl group, R is an organic group, preferably an alkyl group having one to ten carbon atoms, $R^1$ is an alkyl or aryl group, preferably a methyl or ethyl group, and a is an integer within the range of to 12.

Counterparts of these materials where Me is replaced with other organic groups, particularly alkyl groups are useful in the practice of the present invention, as are the other nominative elemental counterparts (e.g., the titania, germanium, zirconium, etc. counterparts of silicon).

As used in the practice of the present invention, it is well understood that the art tolerates or even advises on substitution of groups within these chemical formulae. To that end, wherever the term "group" is used in described a chemical material or functionality, conventional substitution is specifically included within the description of that term. For example, where alkyl group is recited, not only are alkyl moieties such as methyl, ethyl isobutyl, t-butyl, iso-octyl, and dodecyl included, but also alkyls with such conventional substitution as is recognized within the relevant art, such as hydroxymethyl, 1-, or 2-halo-ethyl, omega-cyano-butyl, propyl-sulfonate, etc. with such substituent groups as amino, carboxyl, acyl, etc. tolerated according to the general practices of the art. Where the term "moiety" is used, as in alkyl moiety, that term reflects only the strict definition of alkyl (or other moiety modified group) without allowance for substitution.

Various types of silane, organosilazane, and titanate agents are dissolved or melted in solvent, such as ethanol and diluted with additional solvent (such as xylene) to simplify coating. These solutions/dispersions of hydrolysable materials were sprayed on iron powder for powder metallurgy. The particles could be provided at various dimensions such as those having a mean particle diameter of from 0.01 to 5 mm, with a range of 0.01-1000 μm being preferred, ideally between 0.01 and 250 μm. Graphite particles used in such metallurgical sintering processes tend to be desirably somewhat smaller in average diameter. The particles and liquid may be mixed by any convenient means, such as v-blender, rotary mixer, magnetic stirrer, sonic mixer, floating bed mixer, fluid bed mixer and the like. In simplified cases, mixing with a high speed v-blender for 10 minutes is sufficient to ensure complete coating of the particles. Thereafter, solvents (if present) were removed by a vacuum dryer or simply by elevated temperatures and reduced ambient pressure. The batch of coated particles is then heated for about one 0.1 to 12 hours (e.g., one hour at) temperatures of from about 80 to 200° C. This process is referred to as preliminary treatment of A1 particles.

This initial coating process may be sufficient to cause reaction of the liquid hydrolysable composition, depending on the nature of the particle and the hydrolysable material. Thus, in some cases, this initially coated particle may be ready for the sintering process and may already be a free-flowing (e.g., pourable) solid material that can be added directly to powder metallurgy or sintering molds. It may also be desirable or necessary to further treat the coated particles to assure maximum benefits to the final sintered product and to remove any residual materials that may not be desirable. The additional heating step will be at temperatures of from 40-200° C. for sufficient time to assure reaction, and removal of solvents, without causing substantial bonding of particles together, either through particle-to-particle bonding or by adhesive bonding of the coating between the particles. It is also necessary for this treatment process to avoid complete oxidation of 100% of the hydrolysable compound to a metal oxide or semimetal oxide, preferably to less then 90% hydrolysis.

What is claimed is:

1. A free-flowing metallurgical powder comprising particles of metal and/or metal oxide having unagglomerated number average particle diameters of between 0.01 μm and 5 mm and a liquid coating on the particles consisting essentially of an at least partially hydrolysed hydrolysable compound, the coating comprising from 0.005% to 10% by weight of the particles.

2. The metallurgical powder of claim 1 comprising metal particles and the hydrolysable compound comprises a hydrolysable silicon compound.

3. The metallurgical powder of claim 1 wherein the hydrolys able compound comprises a bydrolysable silicon compound, hydrolysable titanium compound, or hycirolysable zirconium compound.

4. The metallurgical powder of claim 1 wherein the particles and coating consist of at least 99% by weight of the free-flowing powder.

5. The powder of claim 4 wherein the at least partially hydrolysed hycirolysable compound is a silicon compound that consists of less than 25% by weight of an oxide.

6. The powder of claim 4 wherein the at least partially hydrolysed hydrolysable coffipound consists of less tan 5% by weight of an oxide.

7. A sintering process comprising providing the free-flowing powder composition according to claim 1 into a mold, at least 99% by weight of the composition consisting of particles of metal and/or metal oxide having unagglomerated number average particle diameters of between 0.01 μm and 5 mm and the liquid coating on the particles of an at least partially hydrolysed hydrolysable compound, the coating comprising from 0.005% to 10% by weight of the particles, and heating and pressing the composition to sinter the powder.

8. A sintering process comprising providing the free-flowing powder composition according to claim 2 into a mold, at least 99% by weight of the composition consisting of particles of metal and/or metal oxide having unagglomerated number average particle diameters of between .01 and 5 mm and the liquid coating on the particles consisting essentially of an at least partially hydrolysed hydrolysable compound, the coating comprising from 0.005% to 10% by weight of the particles, and heating and pressing the composition to sinter the powder.

9. A sintering process comprising providing the free-flowing powder composition according to claim 3 into a mold, at least 99% by weight of the composition consisting of particles of metal and/or metal oxide having unagglomerated number average particle diameters of between .01 and 5 mm and the liquid coating on the particles consisting of an at least partially hydrolysed hydrolysable compound, the coating comprising from 0.005% to 10% by weight of the particles, and heating and pressing the composition to sinter the powder.

10. A sintering process comprising providing the free-flowing powder composition according to claim 2 into a mold, at least 99% by weight of the composition consisting of particles of metal and/or metal oxide having unagglomerated number average particle diameters of between 0.01 μm and 5 mm and the coating consists of a liquid coating on the particles consisting of an at least partially hydrolysed hydrolysable compound, the coating comprising from 0.005% to 10% by weight of the particles, and heating and pressing the composition to sinter the powder.

11. The method of claim 7 where a lubricant is applied to the wall of the die prior to providing the free-flowing powder composition into the mold.

12. The powder of claim 1 mixed with a lubricant.

13. A sintering process comprising providing the free-flowing powder composition according to claim 4 into a mold, at least 99% by weight of the composition consisting of particles of metal and/or metal oxide having unagglomerated number average particle diameters of between 0.01 μm and 5 mm and the liquid coating on the particles of an at least partially hydrolysed hydrolysable compound, the coating comprising from 0.005% to 10% by weight of the particles, and heating and pressing the composition to sinter the powder.

14. A sintering process comprising providing the free-flowing powder composition according to claim 4 into a mold, at least 99% by weight of the composition consisting of particles of metal andlor metal oxide having unagglomerated number average particle diameters of between 0.01 μm and 5 mm and the liquid coating on the particles consisting of an at least partially hydrolysed hydrolysable compound, the coating comprising from 0.005% to 10% by weight of the particles, and heating and pressing the composition to sinter the powder.

15. A sintering process comprising providing the free-flowing powder composition according to claim 5 into a mold, at least 99% by weight of the total weight of the composition added to the mold consisting of particles of metal and/or metal oxide having unagglomerated number average particle diameters of between 0.01 μm and 5 mm and a coating on the particles of an at least partially hydrolysed hydrolysable compound, the coating comprising from 0.005% to 10% by weight of the particles, and heating and pressing the composition to sinter the powder.

16. A sintering process comprising providing the free-flowing powder composition according to claim 6 into a mold, at least 99% by weight of the total weight of composition added to the mold consisting of particles of metal and/or metal oxide having unagglomerated number average particle diameters of between 0.01 μm and 5 mm and a coating on the particles of an at least partially hydrolysed hycholysable compound, the coating comprising from 0.005% to 10% by weight of the particles, and heating and pressing the composition to sinter the powder.

17. A sintering process comprising providing the free-flowing powder composition according to claim 1 into a mold, at least 98% by weight of the total weight of composition added to the mold consisting of particles of metal and/or metal oxide having unagglornerated number average particle diameters of between 0.01 μm and 5 mm and the liquid coating on the particles consisting essentially of an at least partially hydrolysed hydrolysable compound, the liquid coating comprising from 0.005% to 10% by weight of the particles, and heating and pressing the composition to sinter the powder.

18. The sintering process of claim 7 wherein heating and pressing does not react the liquid coating material to an oxide coating.

19. The sintering process of claim 13 wherein heating and pressing does not react the liquid coating material to an oxide coating.

20. The sintering process of claim 17 wherein heating and pressing does not react the liquid coating material to an oxide coating.

\* \* \* \* \*